Figure 1:
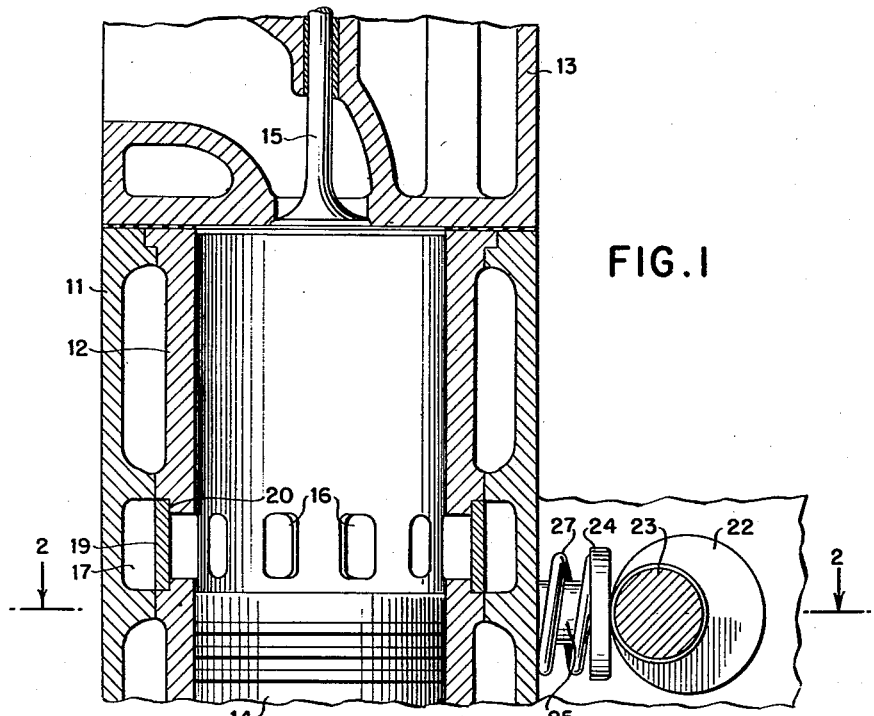

Oct. 22, 1957 H. LANG 2,810,373
FOUR-STROKE CYCLE INTERNAL COMBUSTION ENGINES
Filed April 20, 1955 2 Sheets-Sheet 1

INVENTOR.
Heinrich Lang
ATTORNEY

Oct. 22, 1957    H. LANG    2,810,373
FOUR-STROKE CYCLE INTERNAL COMBUSTION ENGINES
Filed April 20, 1955    2 Sheets-Sheet 2
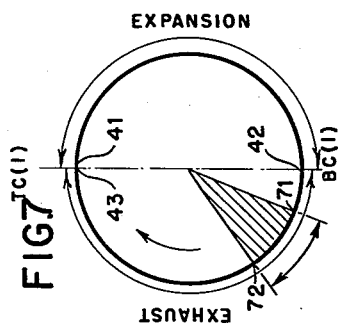
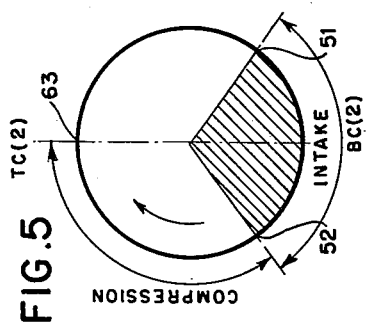
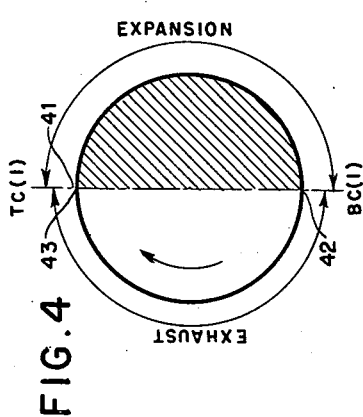
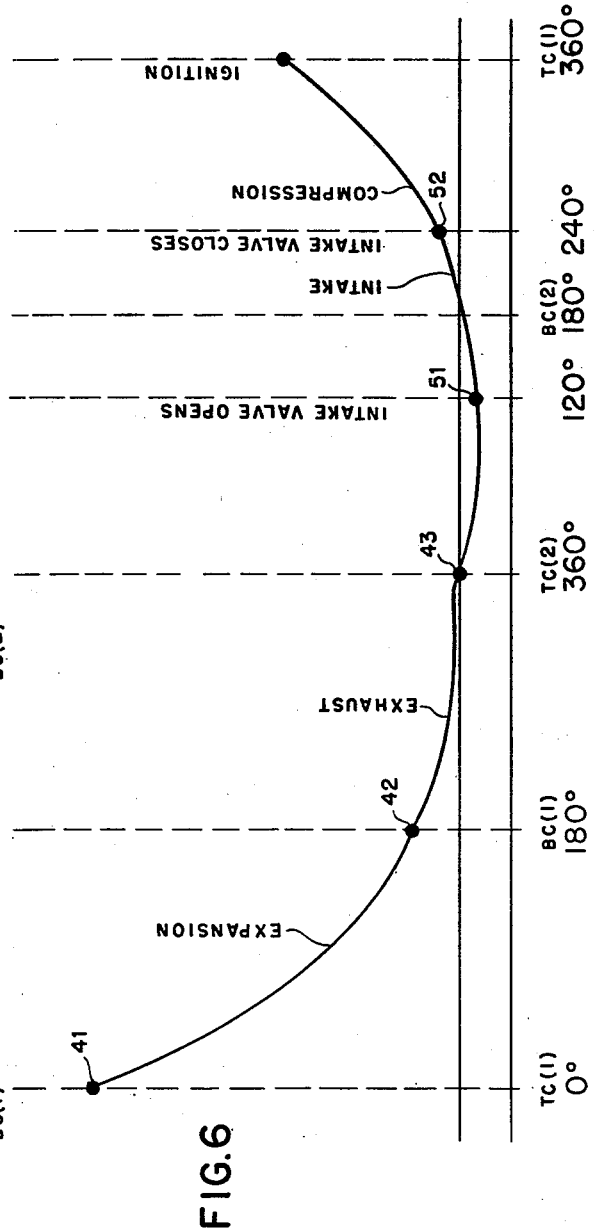
*INVENTOR.*
Heinrich Lang
BY
ATTORNEY

United States Patent Office 2,810,373
Patented Oct. 22, 1957

2,810,373

FOUR-STROKE CYCLE INTERNAL COMBUSTION ENGINES

Heinrich Lang, Munich, Germany, assignor to Durex, S. A., Geneva, Switzerland, a corporation of Switzerland Application April 20, 1955, Serial No. 502,580

Claims priority, application Switzerland May 24, 1954

1 Claim. (Cl. 123—75)

My invention relates to four-stroke cycle internal combustion engines of either the spark-ignition or the compression-ignition type and more particularly to such combustion engines which comprise at least one exhaust valve in or near the cylinder head and a plurality of inlet ports arranged in the engine cylinder wall above the bottom dead center position of the piston to be controlled thereby. In such engines the said inlet ports are encompassed by an annular channel which communicates with the intake piping either directly and continuously or over an intermediately arranged and properly controlled valve. In the first case it is necessary to open the exhaust valve or valves considerably before the end of the expansion stroke to create an underpressure in the cylinder before the inlet ports are opened by the piston and thus to prevent the cumbustion gases to enter the intake piping. In the second case the cumbustion gases are permitted to expand into the intake piping up to the said valve; this, however, results in a quite sudden and substantial decrease of pressure in the cylinder near the end of the expansion or power stroke and therefore in a decrease of efficiency.

It is the principal object of my invention to overcome the said disadvantages. To this effect I arrange a cylindrical slide valve rotatably upon the cylinder within the annular channel which encompasses the inlet ports; said slide valve is provided with control slots conforming to said inlet ports and is actuated by a valve gear driven at half speed of the crank shaft. This slide valve is closed during the expansion stroke and the following exhaust stroke and is continued to be kept closed during the succeeding suction stroke to be opened only shortly before the piston uncovers the intake ports and to close shortly after the piston again covers these ports. Thus a portion of the charge is being pushed back into the annular channel and the piston will start the compression only after it has again covered the intake ports; consequently the actual compression will be shorter than the expansion which will last for the full stroke of the piston from top dead center to bottom dead center.

The said and other objects of my invention will be more fully understood from the following specification when read with the acompanying drawing in which two embodiments are illustrated.

Figure 2:
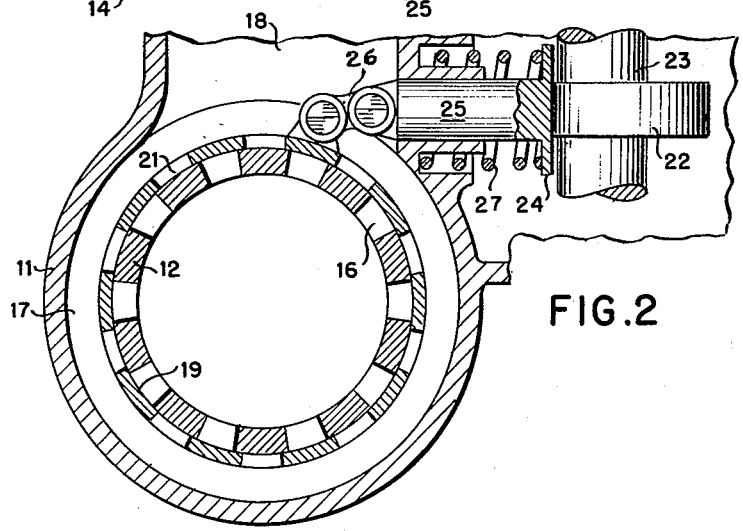
Figure 3:
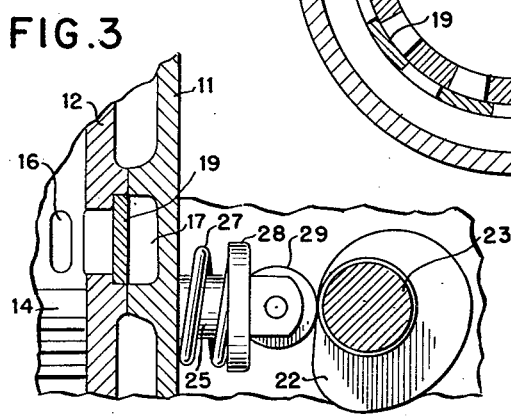

The figures in the drawing show, respectively,

Fig. 1 a longitudinal sectional view of the cylinder of a four-stroke cycle internal combustion engine;

Fig. 2 is a cross section thereof along line 2—2 of Fig. 1,

Fig. 3 a modified detail of the embodiment illustrated in Figs. 1 and 2,

Figs. 4 and 5 valve timing diagrams and Fig. 6 a developed indicator (pressure-volume) diagram all relating to the embodiment illustrated in Fig. 1 and 2, and Fig. 7 a valve timing diagram relating to the modified embodiment illustrated in Fig. 3.

The same reference numerals indicate the same or equivalent parts in all figures of the drawing.

As shown in Figs. 1 and 2 the four-stroke cycle combustion engine comprises a cylinder composed of the barrel 11 and the liner 12, a cylinder head 13, and a reciprocating piston 14 shown in the lowermost position at bottom dead center. At least one exhaust valve 15 is arranged in the cylinder head 13 and is controlled by any suitable gear not shown in the drawing. The cylinder liner 12 is provided with a plurality of inlet ports 16 arranged above the lowermost position of the piston 14 which covers and uncovers said ports during its reciprocating movement. These ports 16 are encompassed by an annular channel 17 which is arranged within the cylinder barrel 11 and is connected to the intake piping 18 through which air, or air and fuel vapor, as the case may be, is introduced into the engine cylinder. A cylindrical slide valve 19 is rotatably seated within said annular channel 17 in a groove 20 of the cylinder liner 11 and is provided with control slots 21 which correspond in number and size to the inlet ports 16 for cooperation therewith. Said slide valve 19 when turned will open and close, respectively, the said inlet ports 16 and thus will connect and disconnect, respectively, the space of the engine cylinder 12 with the intake piping 18.

The said slide valve 19 is actuated by a cam 22 mounted upon the side shaft 23 which rotates at one half of the speed of the not shown crank shaft of the engine. Said cam 22 operates upon the head plate 24 of a tappet 25 the other end of which is jointed to the slide valve 19 by an intermediate link member 26 and effects an angular displacement of said slide valve 19 during the initial period bringing the ports 16 and 21 into coincidence and thus connecting the engine cylinder 12 with the intake piping 18. The slide valve 19 in the position shown in Fig. 2 closes the inlet ports 16 and is held in such position by the spring 27 until the cam 22 displaces the tappet 24 against the force of said spring.

Referring to the valve timing diagram shown in Figs. 4 and 5 and to the developed indicator (pressure-volume) diagram shown in Fig. 6 the operation of the engine may be described as follows:

During the power or expansion stroke all valves are closed, the piston 14 moves from top dead center TC(1) to bottom dead center BC(1) and the pressure decreases as shown in Fig. 6 from 41 to 42. At this time the exhaust valve opens (42 in Fig. 4), remains open during the following exhaust stroke (42—43 in Figs. 4 and 6) and closes again at the end thereof. During the succeeding third cycle TC(2) to BC(2) while all valves are closed the retreating piston creates at first a partial vacuum (43—51 in Fig. 6) until the intake valve 19 opens (51 in Fig. 5) when the inlet ports 16 are being uncovered by the downward moving piston 14 at about 60 degrees before bottom dead center BC(2). This intake valve 19 remains open until the upward moving piston 14 again covers the inlet ports 16 at about 60 degrees behind bottom dead center (52 in Fig. 5) and the pressure in the cylinder increases as shown in Fig. 6 from 51 to 52. At this point 52 (Figs. 5 and 6) the intake valve 19 is being closed and the compression stroke (52—53 in Fig. 6) begins to be followed by the ignition substantially at TC(2). It is evident from the described operation that the full stroke of the piston between TC(1) and BC(1) is utilized for expansion or power utilization (41 to 42 in Fig. 6) and that the actual compression (52 to 53 in Fig. 6) is of shorter duration than the expansion.

Fig. 3 shows a modified gear for the slide valve 19 which controls the inlet ports 16 of the cylinder liner 12 and Fig. 7 shows a valve diagram relating thereto. Here the cam 22 is shaped to effect a short-timed second opening of the inlet ports 16 shortly after the start of the exhaust stroke (42—43 in Fig. 7) between the points 71 and 72. The cam 22 cooperates with a roller 29 mounted upon the tappet 25 on the outer end thereof. The inner end of said tappet 25 is jointedly connected to the slide valve 19 in the manner shown in Fig. 2. A spring 27 pressing against the collar plate 28 holds the roller 29 and the cam 22 in operational contact. The indicator diagram of this embodiment will be substantially the same as that shown in Fig. 6; however the temporary opening of the inlet ports 16 shortly after the start of the exhaust (42—43 in Fig. 6) will effect a scavanging of the cylinder so that fewer combustion gases will remain therein and the highest pressure after ignition (at 41 in Fig. 6) will be higher than in the first described embodiment.

While specific embodiments of my invention have been shown and described in detail to illustrate the application of the principles of my invention, it will be well understood that my invention may be otherwise embodied without departing from such principles and without avoiding the scope of the appended claim.

What I claim as my invention is:

An internal four-stroke combustion engine comprising in combination an engine cylinder; a piston reciprocating therein; at least one exhaust valve near the compression stroke end of said piston; actuating means for said exhaust valve adapted to retain the said valve closed until the piston has at least substantially completed its power stroke; at least one inlet port arranged in the cylinder wall above the bottom dead center position of said piston to be covered and uncovered thereby; an annular channel encompassing said inlet port or ports; the latter being prolongated in axial direction of the cylinder to cause a portion of the intake charge being pushed back into said annular channel by the retreating piston thus shortening the compression well below the length of the expansion; a cylindrical slide valve within said channel rotatably mounted upon the cylinder without leaving any substantial dead space therebetween and having a control slot conforming to each of said inlet ports for cooperation therewith; said slide valve keeping said inlet port or ports closed at the end of each expansion stroke and the beginning of the following exhaust stroke; and a gear for said slide valve oscillating the same angularly relative to the cylinder and holding the said control slot or slots and the said inlet port or ports in coincidence first while the piston keeps said inlet ports uncovered at the end of the suction stroke and the beginning of the compression stroke and second after the start of the exhaust stroke until the piston again covers the said inlet port or ports at least partially.

References Cited in the file of this patent

UNITED STATES PATENTS

| | | |
|---|---|---|
| 1,212,391 | Osborn | Jan. 16, 1917 |
| 1,293,508 | Moore | Feb. 4, 1919 |
| 1,305,172 | Sawtelle | May 27, 1919 |
| 1,906,251 | Dienner | May 2, 1933 |
| 2,403,865 | Lebet | July 9, 1946 |

FOREIGN PATENTS

| | | |
|---|---|---|
| 458,776 | France | Aug. 18, 1913 |